Patented July 3, 1951

2,559,532

UNITED STATES PATENT OFFICE 2,559,532

CHLORO-2-METHYLBENZOFURANS

Gerald H. Coleman, Freeland, and Raymond H. Rigterink, Midland, Mich., assignors to The Dow Chemical Company, Midland, Mich., a corporation of Delaware No Drawing. Application February 28, 1949, Serial No. 78,894

4 Claims. (Cl. 260—346)

1

This invention is concerned with the chloro-2-methylbenzofurans having the formula

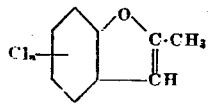

wherein $n$ is an integer from 1 to 4, inclusive.

These new furan compounds may be prepared from the 2-allyl-chlorophenyl acetates having the formula

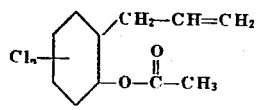

wherein $n$ is an integer from 1 to 4, inclusive. In such preparation, the acetate compound is first treated with bromine to saturate the double bond of the allyl group and obtain a 2-(2,3-dibromopropyl) chlorophenyl acetate as an intermediate. The latter is then reacted with sodium or potassium ethylate.

In carrying out the initial phase of the reaction, substantially equimolecular proportions of the 2-allyl-chlorophenyl acetate and bromine are reacted together in an organic solvent such as carbon tetrachloride. The 2-allyl-chlorophenyl acetate is first dissolved in the solvent and a carbon tetrachloride solution of bromine thereafter added portionwise thereto. The addition is usually carried out at a temperature not greater than 5° C. Following the reaction, the carbon tetrachloride is boiled off to obtain the intermediate 2-(2,3-dibromopropyl) chlorophenyl acetate as a crystalline residue.

In the second phase of the reaction, 5 molecular proportions of sodium or potassium ethylate is reacted with 1 molecular proportion of the above intermediate product. A solution of the ethylate is first prepared by dissolving caustic soda in a molecular excess of ethanol. This solution is then added portionwise to the 2-(2,3-dibromopropyl)-chlorophenyl acetate dissolved in ethanol. The addition is carried out at the boiling temperature of the reaction mixture and under reflux, and the resulting mixture subsequently warmed for a period of time at this same temperature to complete the reaction. The desired product of reaction is obtained from the crude reaction mixture by conventional methods of separation, such as fractional distillation and fractional crystallization.

The 2-allyl-chlorophenyl acetates employed as starting materials, as above described, may be prepared by reacting 2 molecular proportions of acetic anhydride with 1 molecular proportion of a 2-allyl chlorophenol. The reactants are mixed together and the resulting dispersion warmed for 3 hours at the boiling temperature of the reaction mixture and under reflux. Following the reaction, the crude mixture is fractionally distilled under reduced pressure to obtain the desired 2-allyl-chlorophenyl acetate.

The chloro-2-methylbenzofurans of the present invention are oily liquids or crystalline solids, somewhat soluble in many organic solvents, substantially insoluble in water, stable to light and air and non-corrosive to the skin of man and higher animals. They are valuable as intermediates in the preparation of more complex organic derivatives, as modifiers in plastic compositions and as parasiticides.

The following examples illustrate the invention but are not to be construed as limiting.

*Example 1.—5-chloro-2-methylbenzofuran*

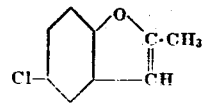

252.6 grams (1.2 moles) of 2-allyl-4-chlorophenyl acetate (boiling at 130°–136° C. at 10 millimeters pressure and having a refractive index $n/D$ of 1.5224 at 25° C.) was dissolved in 800 milliliters of carbon tetrachloride. 191.8 grams (1.2 moles) of bromine dissolved in 700 milliliters of carbon tetrachloride was added portionwise to the above solution over a period of 3 hours with stirring. The addition was carried out at a temperature of below 2° C. and the mixture subsequently held at 0° C. for ½ hour to complete the reaction. The carbon tetrachloride was then removed by distillation to obtain as a crystalline residue, 2-(2,3-dibromopropyl)-4-chlorophenyl acetate. The latter was further purified by recrystallization from petroleum ether and found to have a freezing point of 54.5° C.

296.2 grams (0.8 mole) of this 2-(2,3-dibromopropyl)-4-chlorophenyl acetate was dispersed in 200 milliliters of ethanol. An alcoholate solution formed by dissolving 160 grams (4.0 moles) of sodium hydroxide in 434 grams (9.4 moles) of ethanol was added portionwise to the above mixture over a period of 2 hours. The addition was carried out at the boiling temperature of the reaction mixture and under reflux, and the resulting mixture subsequently heated under reflux for two hours to complete the reaction. The vessel and contents were then cooled to room temperature. The crude product was diluted with 1000 milliliters of water, the resulting mixture separating into oil and aqueous layers. The latter was separated and extracted with benzene, and the extract and oil layer combined and dried with anhydrous calcium chloride. This dried product was fractionally distilled under reduced pressure to obtain 5-chloro-2-methylbenzofuran as an oily liquid. The latter had a boiling range of 128°–133° C. at 25 millimeters' pressure, a specific gravity of 1.2122 at 25°/4° C., a refractive index $n/D$ of 1.5733 at 25° C. and a chlorine content of 21.3 per cent. The theoretical chlorine content for $C_9H_7ClO$ is 21.3 per cent. This product was dispersed in a low boiling petroleum distillate to prepare a composition containing 5 grams of toxicant per 100 milliliters of solution. When employed for the control of house flies, such composition gave a kill of 50 per cent in 24 hours in accordance with a modified Peet-Grady test.

*Example 2.—5,7-dichloro-2-methylbenzofuran*

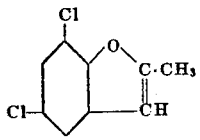

146.8 grams (0.6 mole) of 2-allyl-4,6-dichlorophenyl acetate (boiling at 142°–148° C. at 10 millimeters' pressure) was dissolved in 600 milliliters of carbon tetrachloride. 95.9 grams (0.6 mole) of bromine dissolved in 400 milliliters of carbon tetrachloride was added portionwise thereto over a period of 1¾ hours. The addition was carried out at a temperature of from −3° to 1° C., and the resulting mixture subsequently held at 0° C. for 1 hour to complete the reaction. The carbon tetrachloride was then removed by distillation to obtain as a crystalline residue, 2-(2,3-dibromopropyl)-4,6-dichlorophenyl acetate. The latter was further purified by recrystallization from petroleum ether and found to melt 106°–108.5° C.

202.4 grams (0.5 mole) of this 2-(2,3-dibromopropyl)-4,6-dichlorophenyl acetate intermediate was dispersed in 400 milliliters of ethanol. 100 grams (2.5 mole) of sodium hydroxide dissolved in a molecular excess of ethanol was added over a period of one hour with stirring to the above mixture. The addition was carried out at the boiling temperature and under reflux, and the resulting mixture subsequently heated under reflux for 2½ hours to complete the reaction. The alcohol was then removed by evaporation, and the residue diluted with 500 milliliters of water. The resulting mixture separated into oil and aqueous layers. The latter was separated and extracted with benzene, and the extract and oil layer combined and dried with anhydrous calcium chloride. This product was fractionally distilled under reduced pressure to obtain 5,7-dichloro-2-methylbenzofuran as a crystalline solid. The later had a boiling range of 132°–140° C. at 10 millimeters' pressure, a freezing point of 66.2° C. and a chlorine content of 34.7 per cent. The theoretical chlorine content for $C_9H_6Cl_2O$ is 35.3 per cent. This product was dispersed in a low boiling petroleum distillate in the amount of 5 grams of toxicant per 100 milliliters of solution. When employed for the control of house flies, such composition gave a kill of 90 per cent in 24 hours in accordance with a modified Peet-Grady test.

*Example 3.—4,5,7-trichloro-2-methylbenzofuran*

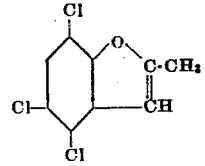

53.8 grams (0.192 mole) of 2-allyl-3,4,6-trichlorophenyl acetate (boiling at 154°–163° C. at 10 millimeters' pressure) was dissolved in 200 milliliters of carbon tetrachloride. 30.8 grams (0.192 mole) of bromine dissolved in 100 milliliters of carbon tetrachloride was added portionwise thereto over a period of 1⅓ hours with stirring. The addition was carried out at a temperature of from −2° to 1° C. Stirring was continued for ½ hour and the temperature of the mixture allowed to rise to room temperature over a period of 17 hours. The carbon tetrachloride was then removed by distillation, and the residue recrystallized from petroleum ether to obtain 2-(2,3-dibromopropyl)-3,4,6-trichlorophenyl acetate, as a crystalline solid melting at 96°–99° C.

71.4 grams (0.163 mole) of 2-(2,3-dibromopropyl)-3,4,6-trichlorophenyl acetate was dispersed in 200 milliliters of ethanol. 32.5 grams (0.814 mole) of sodium hydroxide dissolved in a molecular excess of ethanol was added portionwise to the above mixture over 20 minutes with stirring. The addition was carried out at the boiling temperature and under reflux, and the resulting mixture subsequently heated under reflux for 2 hours to complete the reaction. The ethanol was then removed by evaporation and the residue diluted with 500 milliliters of water. The resulting mixture was cooled in an ice bath and filtered, and the residue recrystallized for methanol to obtain as a crystalline solid, 4,5,7-trichloro-2-methylbenzofuran. The latter had a melting point of 80°–82.5° C. and a chlorine content of 45.2 per cent. The theoretical chlorine content for $C_9H_5Cl_3O$ is 45.0 per cent. This product was dispersed in a low boiling petroleum distillate in the amount of 5 grams of toxicant per 100 milliliters of composition. When employed for the control of house flies, such composition gave a kill of 100 per cent in 24 hours in accordance with a modified Peet-Grady test.

In a similar manner other chloro-2-methylbenzofurans may be prepared of which the following are representative.

7-chloro-2-methylbenzofuran by reacting bromine with 2-allyl-6-chlorophenyl acetate, and the resulting intermediate with sodium ethylate.

4-chloro-2-methylbenzofuran by reacting bromine with 2-allyl-3-chlorophenyl acetate, and the resulting intermediate with sodium ethylate.

4,7-dichloro-2-methylbenzofuran by reacting bromine with 2-allyl-2,5-dichlorophenyl acetate, and the resulting intermediate with sodium ethylate.

5,6,7-trichloro-2-methylbenzofuran by reacting bromine with 2-allyl-2,3,4-trichlorophenyl acetate, and the resulting intermediate with sodium ethylate.

We claim:

1. A chloro-2-methylbenzofuran having the formula

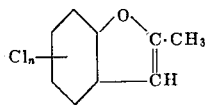

wherein $n$ is an integer from 1 to 4, inclusive.

2. 5-chloro-2-methylbenzofuran.
3. 5,7-dichloro-2-methylbenzofuran.
4. 4,5,7-trichloro-2-methylbenzofuran.

GERALD H. COLEMAN.
RAYMOND H. RIGTERINK.

REFERENCES CITED

The following references are of record in the file of this patent:

Hurd et al.: J. Am. Chem. Soc., vol. 58, page 941 (1936).

Beilstein, vol. XVII/XIX, 1st supplement, pages 24, 25 and 59.